H. A. HERR.
METHOD OR PROCESS OF SEPARATING LIQUIDS FROM SOLIDS.
APPLICATION FILED DEC. 23, 1915.
1,212,638.
Patented Jan. 16, 1917.
10 SHEETS—SHEET 1.
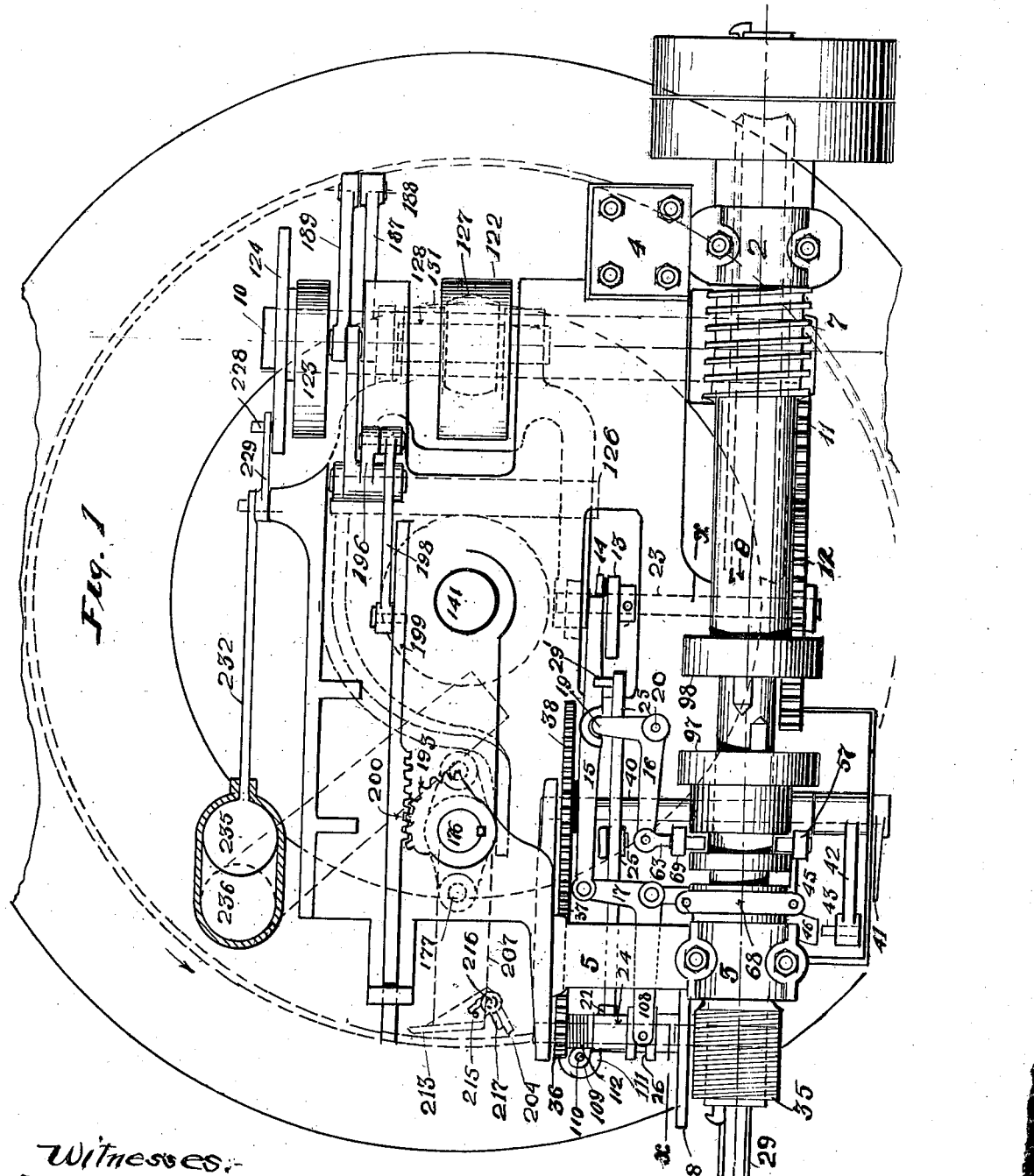

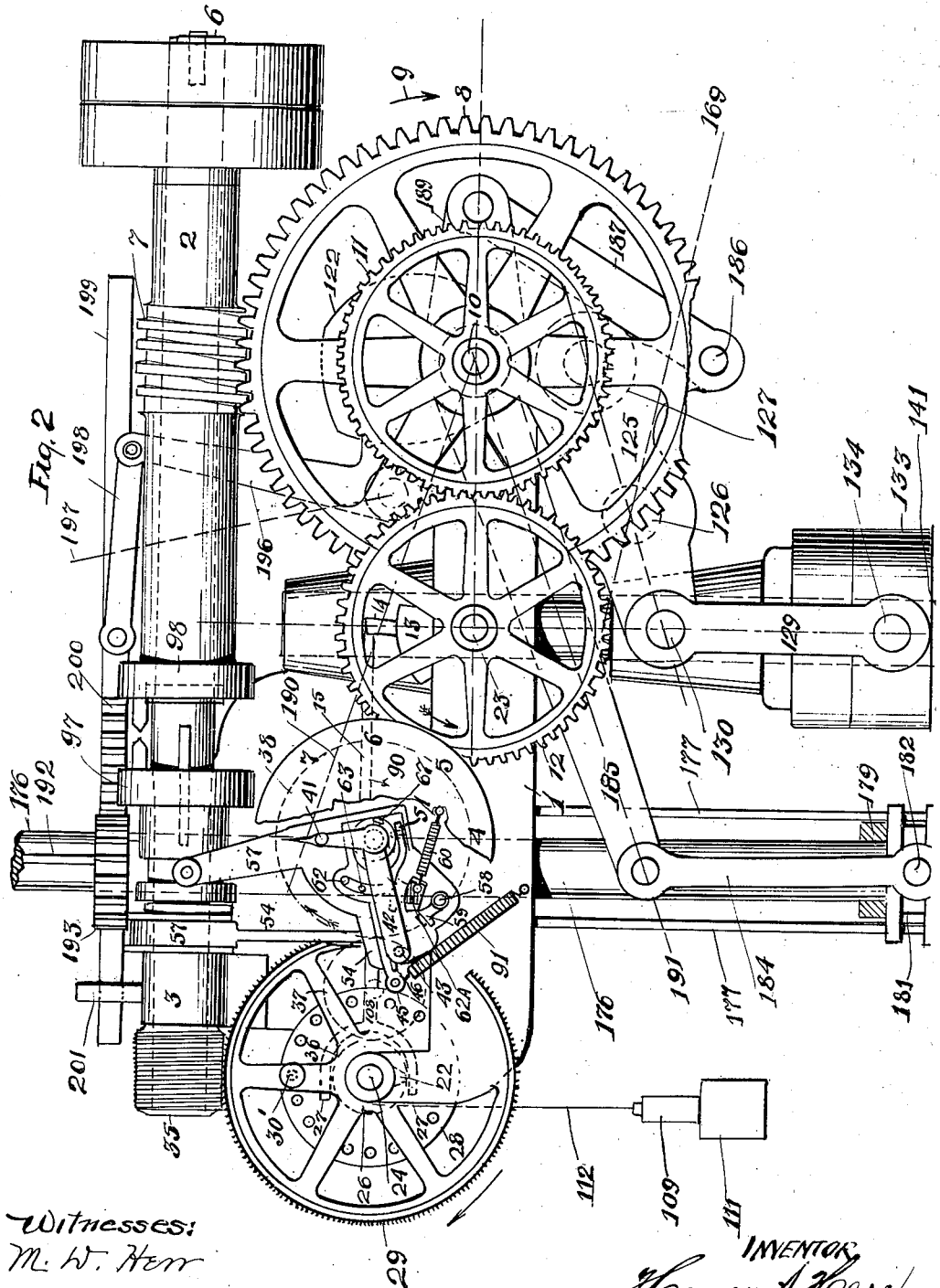

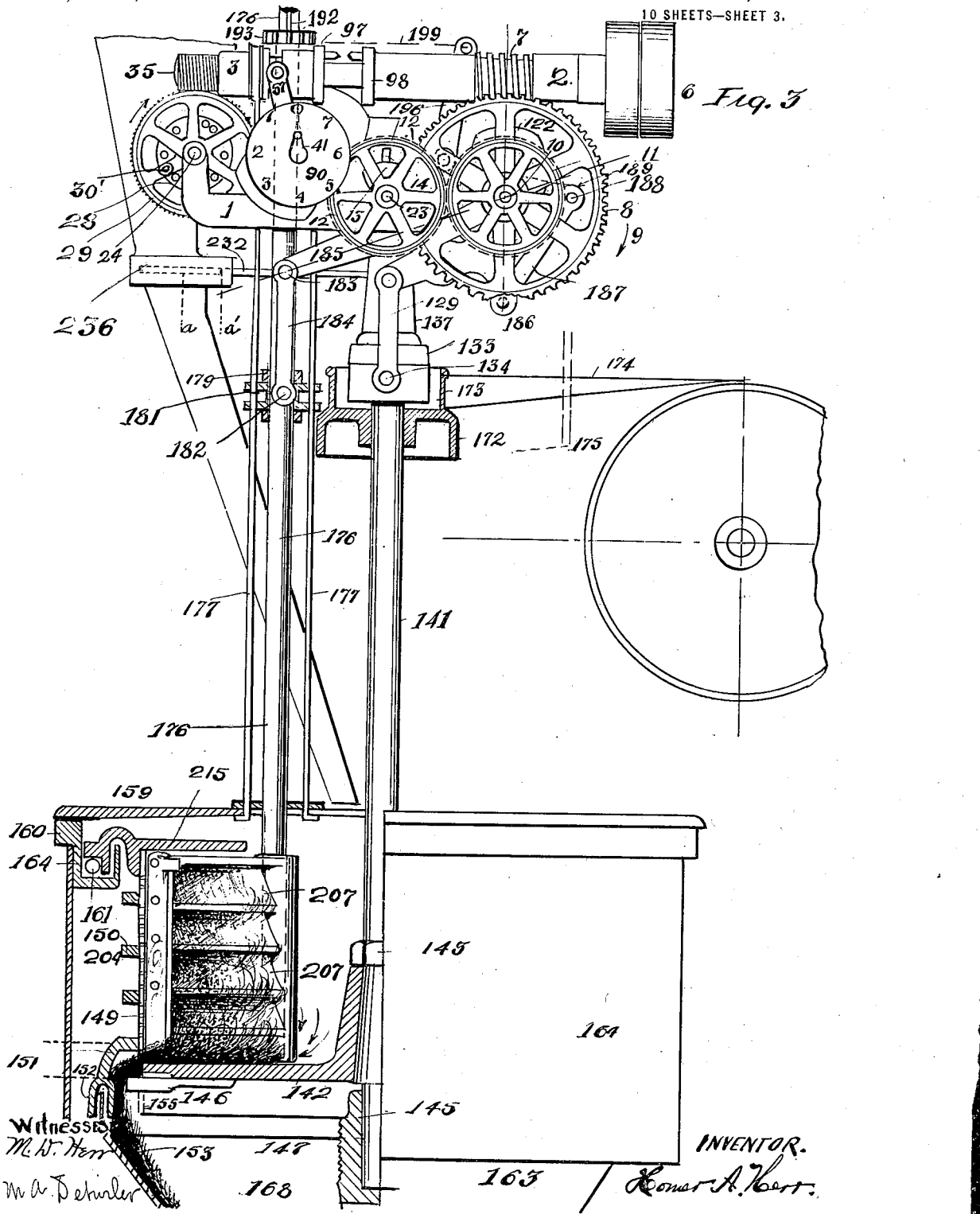

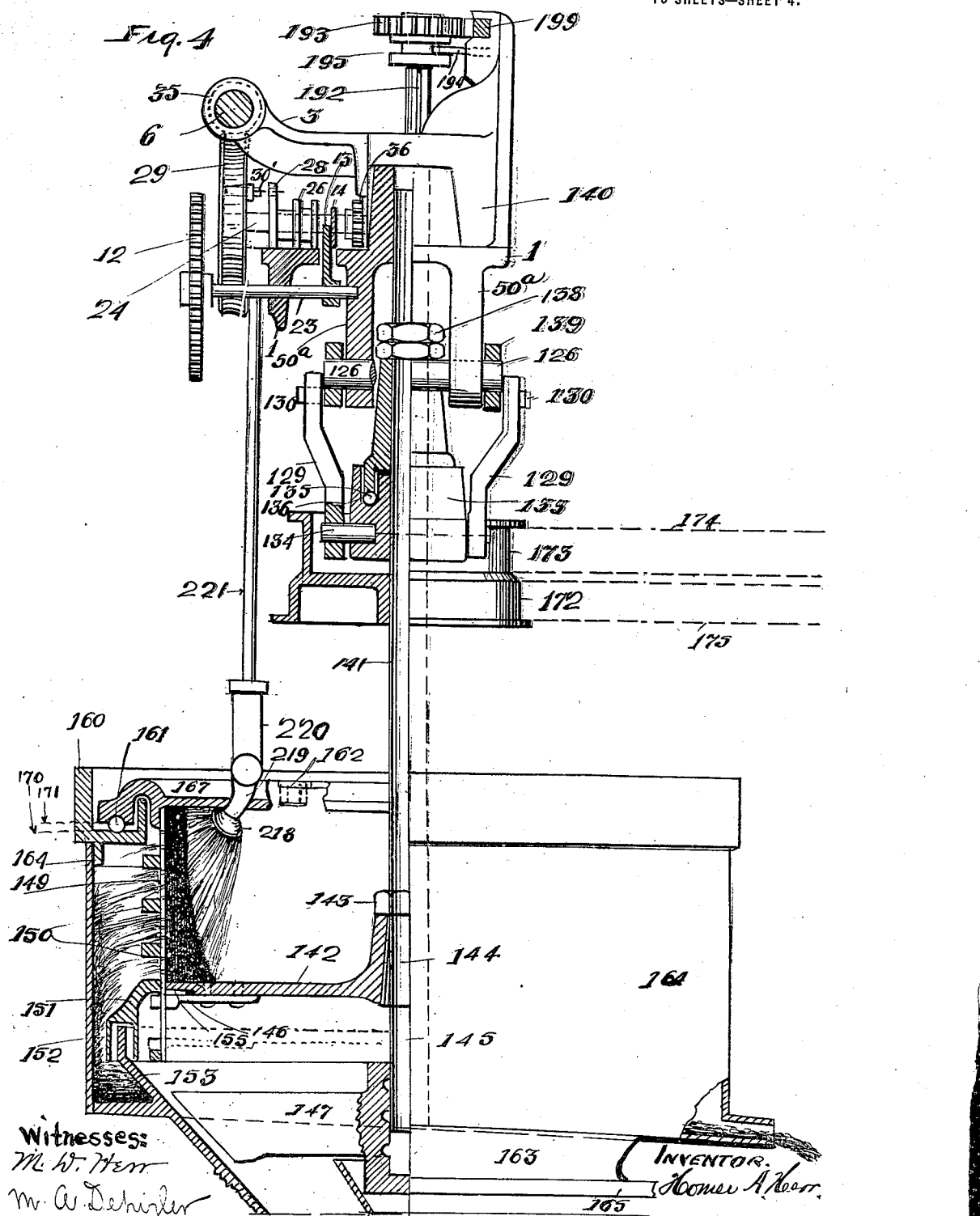

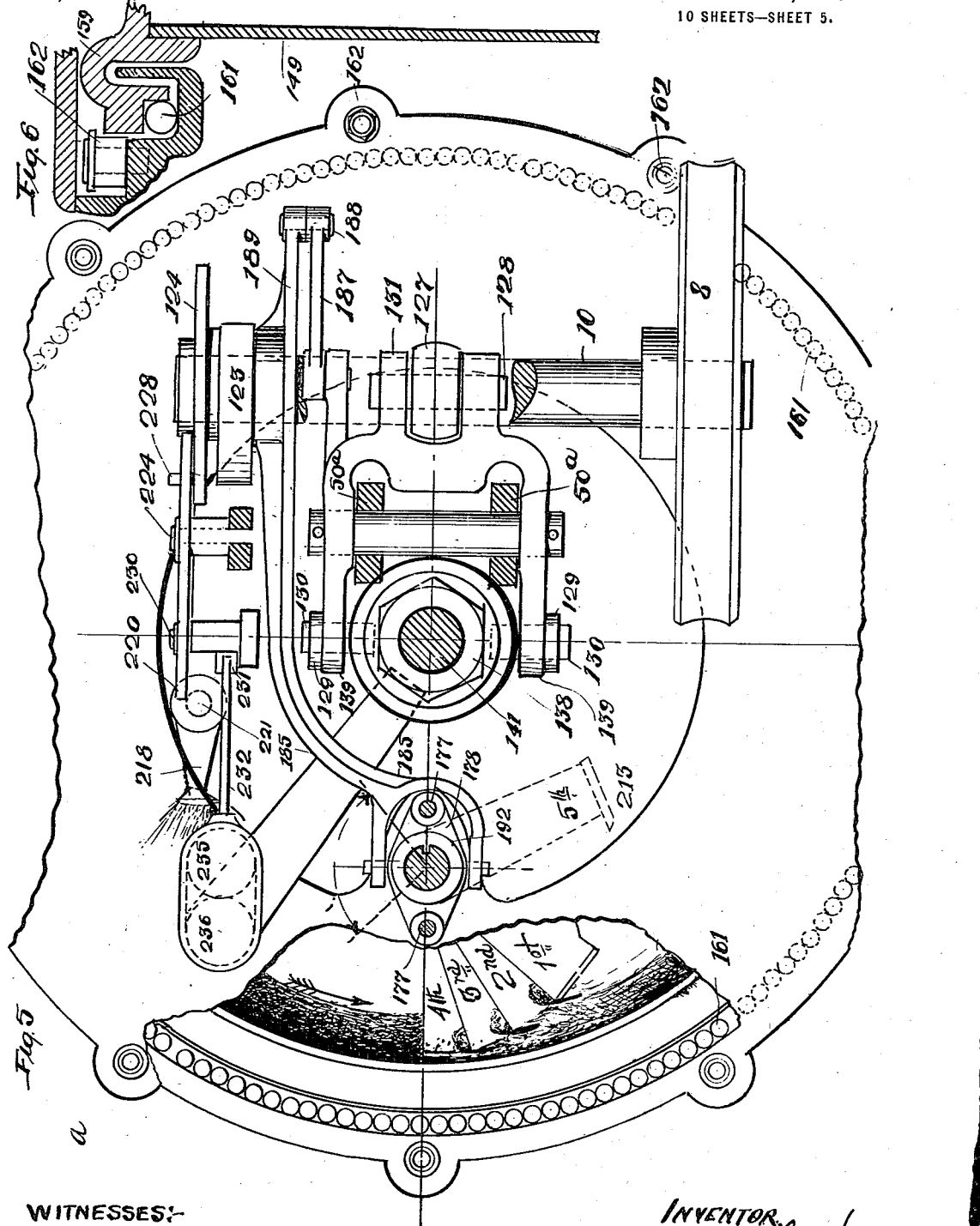

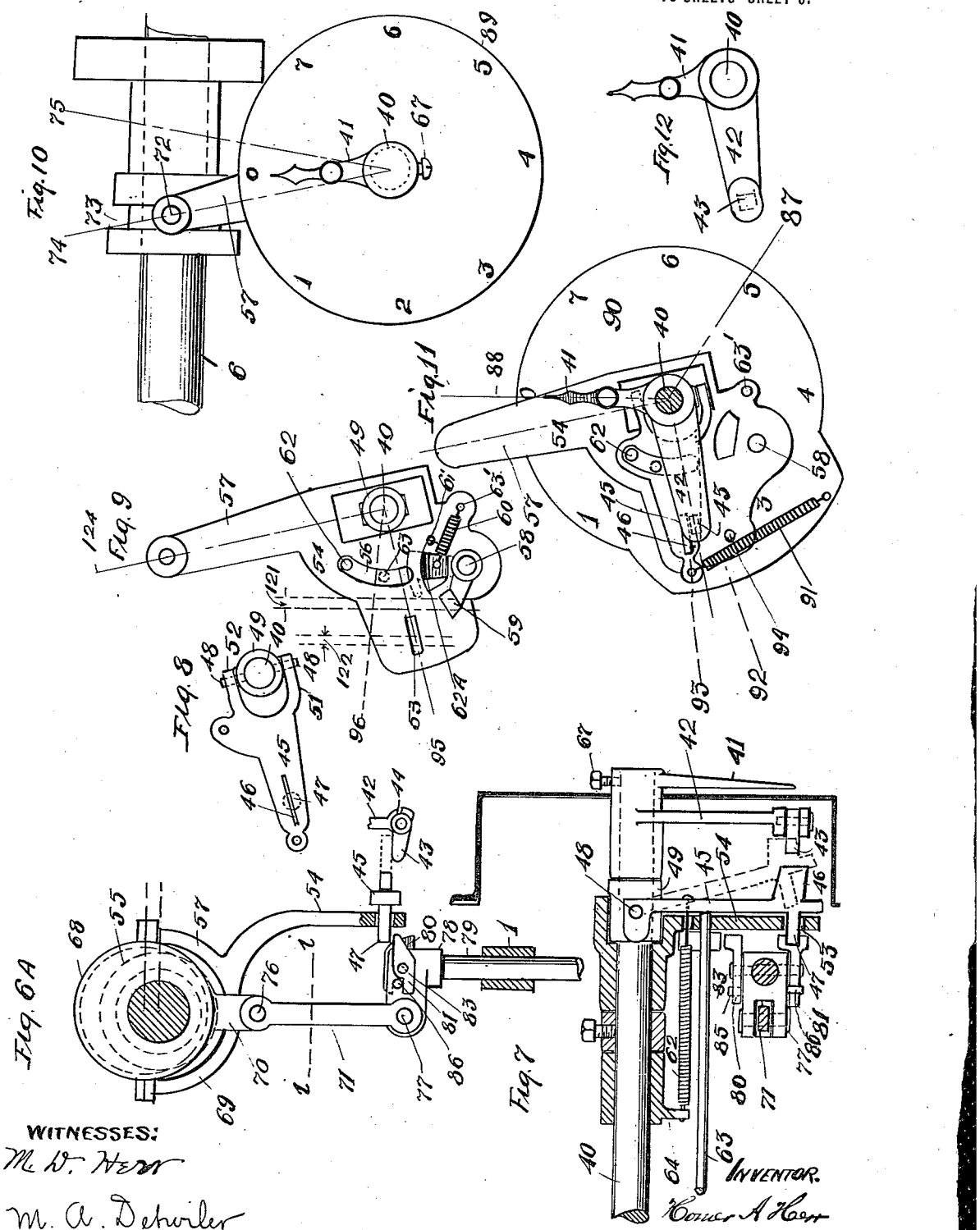

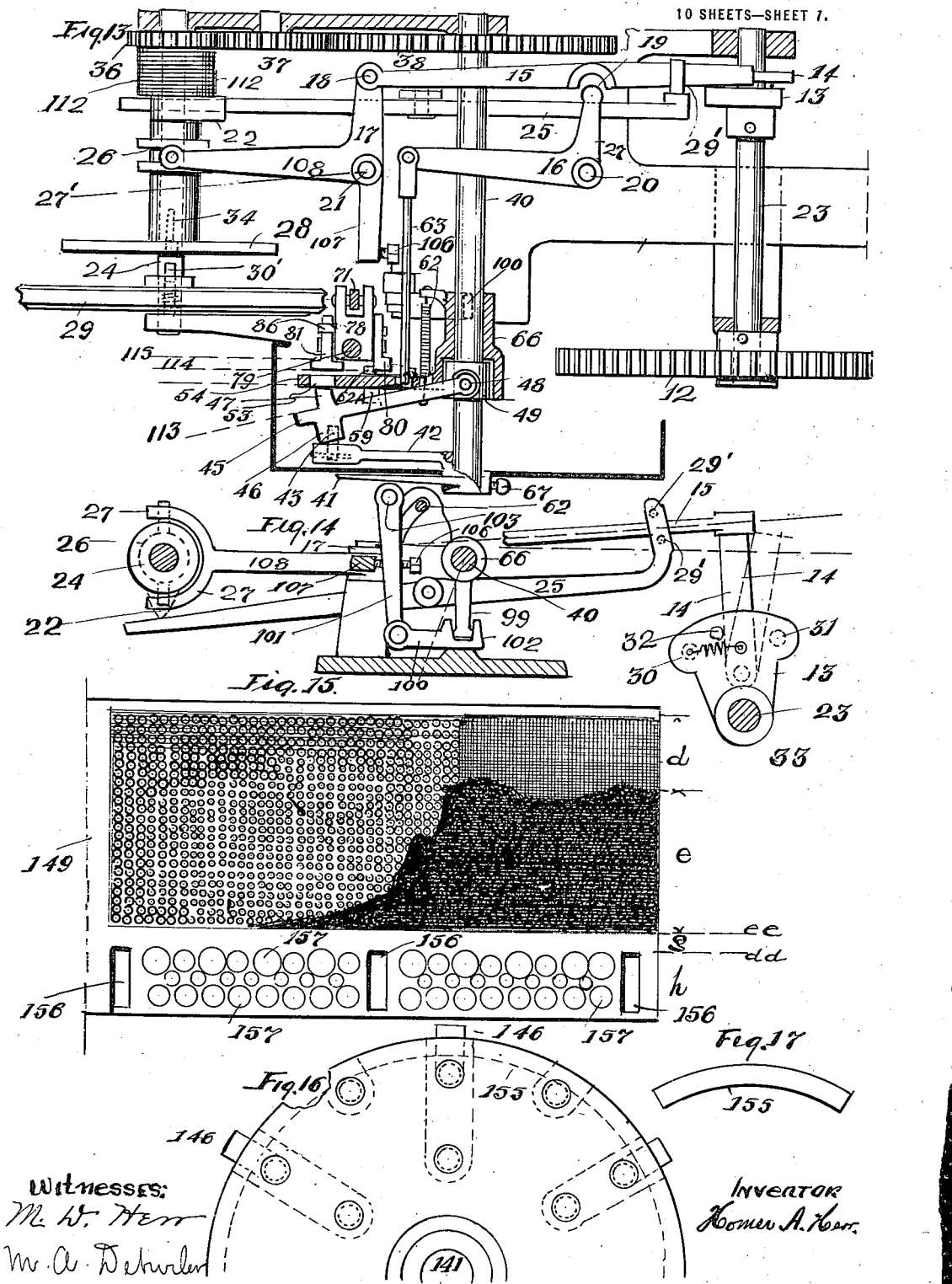

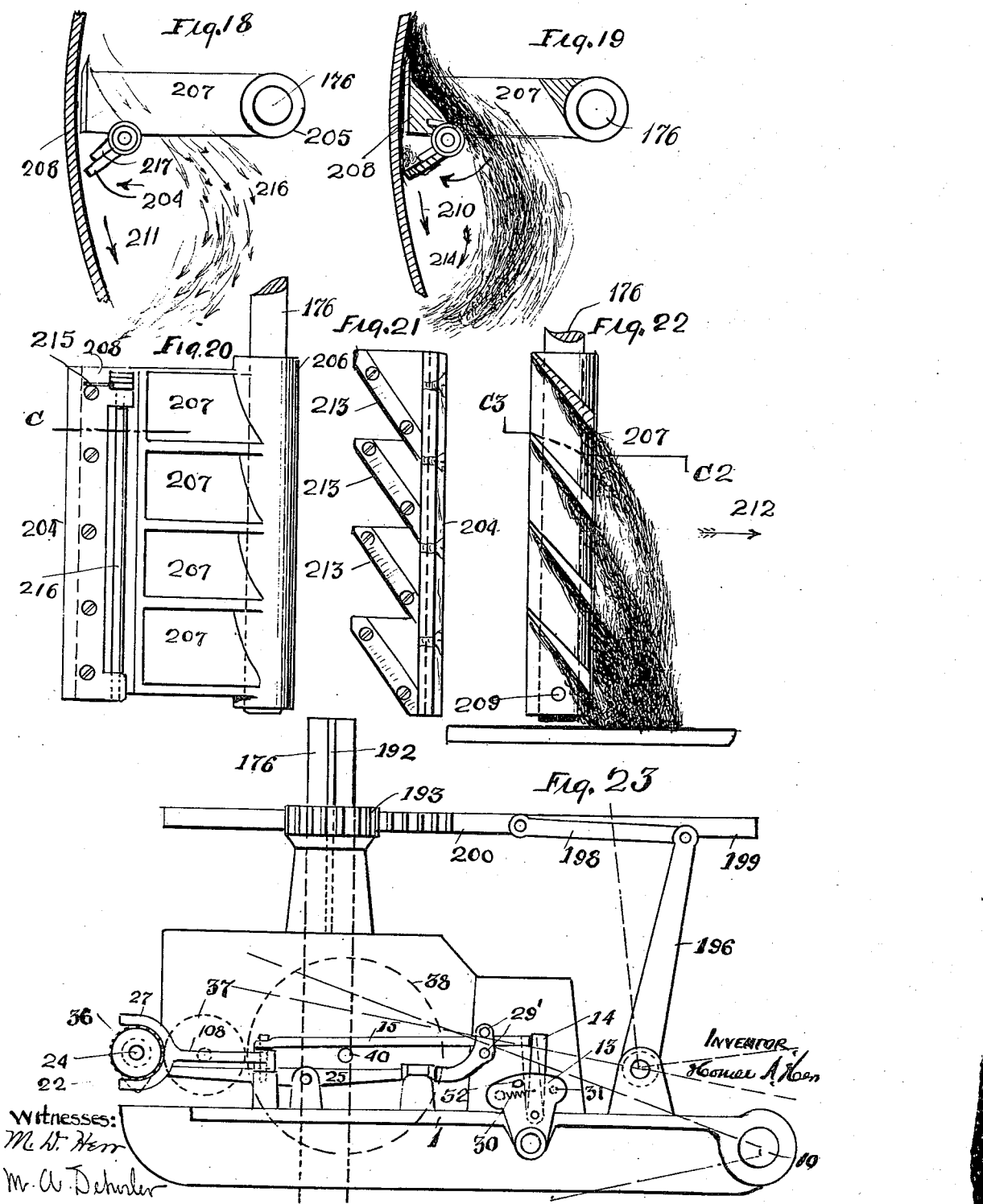

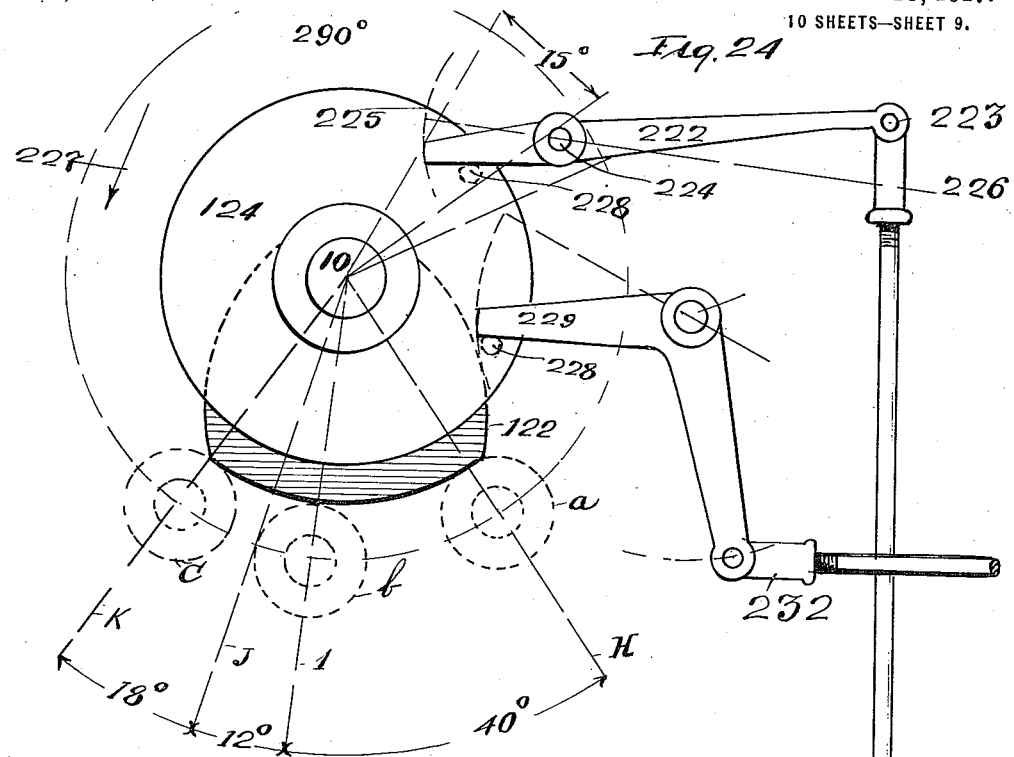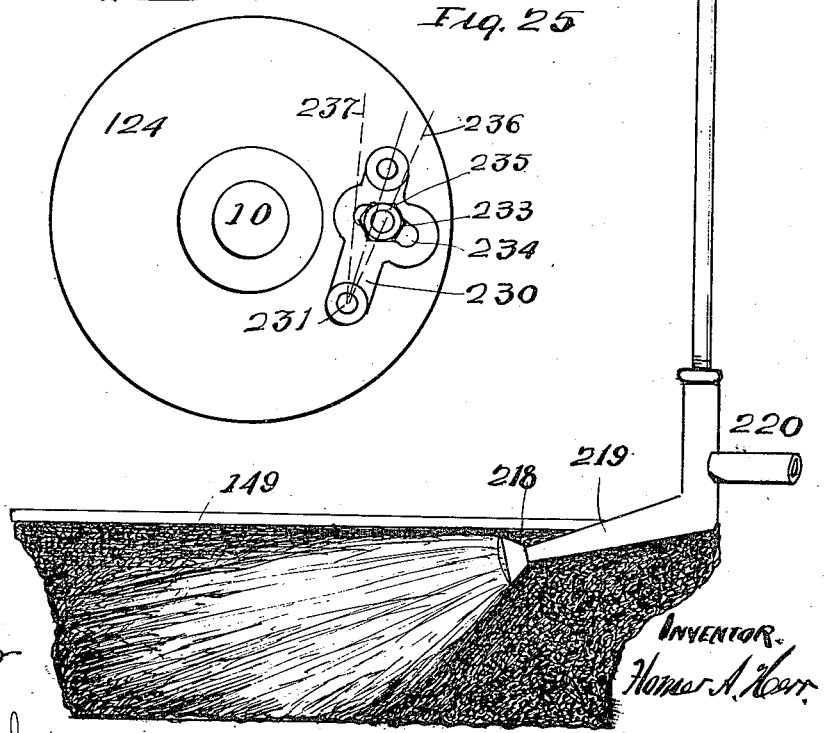

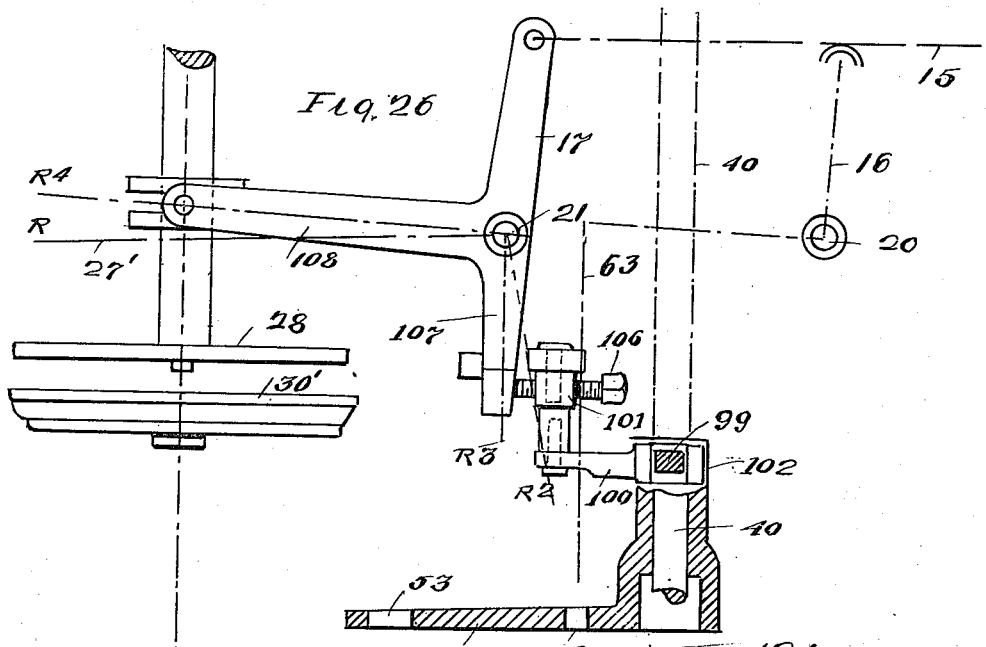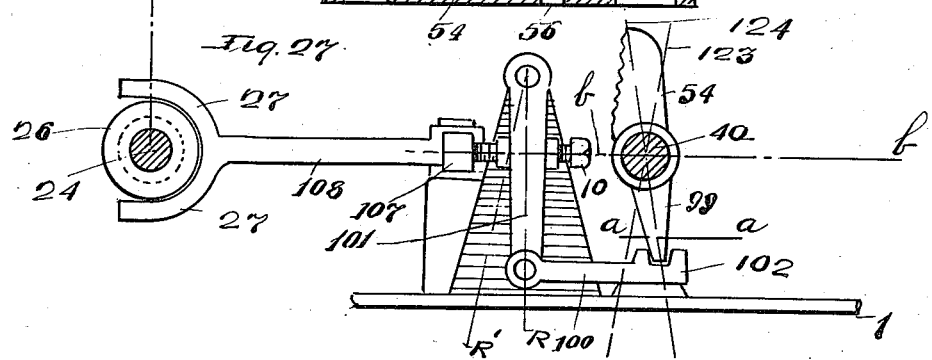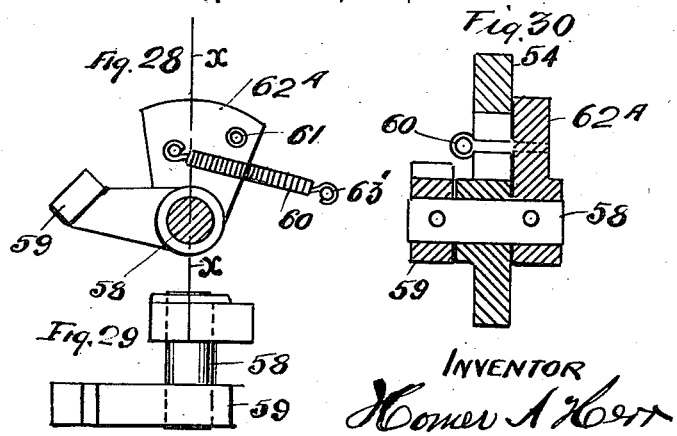

UNITED STATES PATENT OFFICE.

HOMER A. HERR, OF PHILADELPHIA, PENNSYLVANIA.

METHOD OR PROCESS OF SEPARATING LIQUIDS FROM SOLIDS.

1,212,638. Specification of Letters Patent. Patented Jan. 16, 1917.

Original application filed September 21, 1908, Serial No. 456,063. Divided and this application filed December 23, 1915. Serial No. 68,333.

*To all whom it may concern:*

Be it known that I, HOMER A. HERR, a citizen of the United States, residing at Philadelphia, in the county of Philadelphia and State of Pennsylvania, have invented certain new and useful Improvements in Methods or Processes of Separating Liquids from Solids, of which the following is a specification.

This application is a division from my application No. 456,063, filed September 21st, 1908 and consists of a method or process of separating liquids from solids.

My invention has reference to a process or method of separating and cleaning liquids from solids, such as sugar from syrup, bauxite clay from caustic soda, magnesia from water, or any substance where solids are to be separated from their associated liquids.

In carrying out my invention I used the force acquired by rotation to discharge the solids, as well as the liquids from a rotating vessel. I employ a high speed for forcing the solids and a slow speed for passing the liquids from their containing vessel. I retain my unseparated mass in the vessel for a predetermined time, during which time the liquid is passing from the solids at a high speed. I then reduce the speed and discharge the solids by the force induced by the speed, I do this in a continuously intermittent manner. That is, I intermittently put material into the vessel, intermittently rotate the vessel at high speed, intermittently arrest the speed, intermittently rotate the vessel at slow speed, and intermittently pass the solids from the vessel at slow speed.

In carrying out my invention in practice I may, in some materials, find it desirable, after putting material in my vessel and rotating it at high speed, separating the liquid by the force acquired by the speed and arresting the speed of the vessel entirely, and then rotating the vessel at slow speed and use the force acquired by the slow speed to clean the separated solids.

My method also contemplates, in material that requires it, the washing and cleaning of the separated solids and the separating of the water from the solids washed, such as sugar: in which is contemplated the separating of the unseparated mass by rotating the same in a vessel at high speed, after separating washing the same at high speed, then reducing the speed of the separated solids and by the force of rotation expel the solids from the vessel.

The fundamental object of my method is to save labor in cleaning the solids out of the basket that have the liquid separated therefrom by centrifugal force at high speed and which leaves the solids hanging on the inner shell of the basket or vessel and in such a manner that they will not drop unaided. It is not possible to clear the vessel of solids of this impacted material in any practical manner to meet commercial or industrial needs or requirements at high separating speed, as the enormous power inherent in the mass at high speed renders the mass practically uncontrollable at this time for purposes of discharging the same; but when I reduce the speed of the vessel and the mass to such a degree that the laws of centrifugal force and momentum will co-act with the laws of gravity, then I can control the solids and clear the vessel by a co-action of the laws of centrifugal force, momentum and gravity and the material passes from the vessel in a reliable, efficient and controllable manner.

To make the effectiveness of my method somewhat more clear we will assume that I have a centrifugal basket 42" in diameter and 26" deep—a standard construction—and we will further assume that this basket is rotating at 1600 R. P. M. Now a basket of this type at this speed will develop a centrifugal intensity at a ratio of 1 to 1525.66, in other words each pound of material entering the basket will immediately have its gravity accelerated to practically weigh 1525.66 pounds. Now at the period of unloading, after separating a mass of unseparated material, there usually remains in the basket hanging on the shell wall about 450 pounds of separated solids, which solids have a gravity intensity at a basket speed of 1600 R. P. M. of 686,700 pounds or 343 tons. A static cleaner brought in contact with this enormous force will be wrecked and destroyed and any of the wall adhering material engaged by it, prior to destruction, will fly in every direction and be absolutely uncontrollable; the destructive agency at work being the accelerated gravity of the mass, or centrifugal force. I cannot bring the force of gravity to co-act with the force of this enormous accelerated gravity of 343 potential tons in order to pass from the basket 450 pounds of separated material solids; to do this I must get rid of this enormous force and I can only do so by reducing the speed of my mass to the proper slow speed. The proper slow speed for unloading a granular substance or material, such as sugar or salt, is 80 R. P. M. and when I reduce the speed of the basket to 80 R. P. M. I reduce the centrifugal force of the mass to a ratio of 1 to 4.75 pounds, which means that every pound of material that is separated and hanging on the wall of the vessel will have a potential weight of 4.75 pounds and the 450 pounds I attempted to unload or get out of the vessel at 1600 R. P. M. instead of offering a resistance of 686,700 pounds will have this resistance reduced to 1950 pounds and at this resistance, so enormously reduced, centrifugal force, momentum of mass and gravity will all co-act to pass the material from the basket, through the port provided, in a reliable, controllable and highly efficient manner to meet the most exacting industrial needs.

The slow unloading speed must be varied to suit the material and sometimes to meet different conditions of the same material. A granular substance such as sugar or salt will require a centrifugal intensity of about from 4 to 6 pounds. Bauxite clay, kaolin and similar substances will require a slow speed to produce a centrifugal intensity of from 20 to 25 pounds, both must be uniformly maintained during the unloading period. Usually each separate material has some physical characteristic which require force modified, or in modified degree extended to resist adhesion of the passing mass to its conducting surface.

It is obvious that any well known or old means for reducing or accelerating speeds and maintaining speeds so varied could be employed in carrying out my invention or method, when any type of centrifugal was employed aside from that shown in my special machine, as set out in this my specification. It is also evident that I do not limit my means for operating the basket at two speeds to a belt with a variable size to the pulleys, but I desire it understood that any operating means that will give to a centrifugal basket a high separating speed and will permit of reducing the speed of the basket to a slow cleaning speed would be the full equivalent of my belt and pulleys.

In carrying out my invention, I employ a special machine of which the following is a description and specification, but I do not limit myself to the employment of this machine as any machine or means that would intermittently permit the feeding of unseparated material to a vessel, rotating the vessel at high speed, at which speed liquids are passed from their associated solids then permit or give to said vessel a slow speed, at which speed a scraper cleans the wall of the vessel of separated solids which are passed from the vessel by force acquired by rotation of the mass combined with and initially induced by the action of the scraper could carry out my invention equally with my special machine herein described.

My machine consists of a separating cylindrical vessel having the lateral walls, but not absolutely essentially, of novel perforations at their lower end (the shell carries a fine perforated brass or copper filtering sheet reinforced in accordance with the well known requirement for strength). This reinforcement consists of a heavy cylindrical sheet of steel with large perforations to permit the passage therethrough of the molasses liquids or syrups and this cylinder of steel is again externally reinforced by the usual steel rings. Between the exterior wall of the basket and the interior wall of the outer casing is the syrup collecting chamber into which the syrup passes after passing through the perforations hereinbefore named. This outer casing at its upper end carries a ball race in which the balls are supported for carrying the basket. The over-reach of the basket projects over the ball channel or race and in this manner do I support the basket entirely independent of the main vertical shaft of the machine. The inner over-reach and outwardly extending over-reach are an integral element and should be turned true and well balanced, and it should be positioned absolutely concentric with the center of the shaft when the machine is erected and in operation.

A further feature of my invention is the manner in which the bottom of the basket is dropped out of position and thus the purged residuum is free to pass out by reason thereof, and the basket thus cleared for another load. To this end I make my shaft reciprocate vertically. The bottom of the basket is fixed to this shaft and holds the cylindrical walls of the basket in a fixed horizontal plane. (I, however, desire it understood I could revise this kinetic relation and instead of moving the bottom, I might keep the bottom in a fixed horizontal plane and give the walls of the basket a vertical reciprocation. The scope of my claims does not limit me in this regard and I desire it so understood.) The essential function accomplished is that I use force acquired by rotation to clear the basket of the solids, as well as the liquids, and I expose a discharge port in the basket wherethrough solids are passed after being scraped from the shell of the basket while rotating at a reduced speed, maintained with approximate uniformity. It is not essential to my method that this port should be of any particular form or have any specific location, so long as the separated solids are removed from the shell of the basket by scraping the basket wall by any character of static cleaner, while the basket is rotating and the separated material in this manner removed from the said shell, and thereafter is conducted to the exposed exit port while rotating, at the slow, sustained and regulated speed.

The means I employ for dropping the vertical shaft and the bottom of the basket which it carries out of its normal position, I will describe hereinafter in this specification. The bottom of the basket carries radial projecting lugs, and the basket walls are slotted vertically at various points to receive and retain these lugs. The vertical limit of these slots is made to conform with the vertical reciprocation of the bottom of the basket and its supporting vertical shaft. Below the normal line of the bottom I have enlarged holes or slots in the cylindrical walls of the basket through which the residuum remaining in the basket after the purging, is discharged into a receptacle below the machine. The discharging holes need be of no particular shape or in any specific position or location and there can be one or more of such holes or passageways. So long as it or they will serve as a discharge port from the inner to the outer side of the basket or vessel, are closed at high or separating speed, preferably, and can be opened or made available to permit of solids passing at the slow speed, they would come within the scope of my invention.

A third feature of my invention is to provide a time controller for pre-determining the time that material shall remain in the basket subject to centrifugal action. This time varies with the nature of the material, but can be made to suit any requirement. The specific description I will give later in this specification.

A fourth feature of my invention is to provide an automatic gate for the admission of syrup to the basket to be operated immediately following the return of the basket bottom to its normal position and the controlling of the time for opening and closing this gate.

A fifth feature of my invention is the means I employ to clean the basket after the material is purged. This consists broadly of a plow or scraper, stationary, as to any except vertical movement and a slight slow oscillation, which, as the bottom descends with the prime vertical shaft which supports it, it also descends and, after it has reached its lower position, it is slowly swung in the path of the residuum and gradually removes the said residuum mass which hangs to the sides of the inner wall of the centrifugal basket and drives it to the bottom of the basket where the centrifugal force and action, being unrestricted by a resisting wall by virtue of the holes aforesaid, will force it from the zone of the basket into the passage leading to the receptacle below and outside of the machine.

The construction of this plow is such that a steel knife will remove all of the residuum in very small vertical sections as the rotating mass comes in contact herewith while the plow is oscillated slowly to the zone of the residuum. This knife, however, cannot come in contact with the wall of the basket as its radius is shorter than the radius of the inner wall of the basket, but I propose a wood scraper, having an extended radius and carried by the plow which slightly scrapes the wall and thoroughly cleans it. This plow, aside from the knives and wood scrapers, carries a series of angular, downwardly inclined wings, one for each knife, and as each knife removes its section of residuum from the lateral wall of the basket its co-acting wing takes it and forces it down violently to the bottom of the basket where centrifugal action will expel it from the basket zone as set out. I also provide means for returning this plow to its normal position after each action.

A sixth feature of my invention is to provide a means to inject a spray of water into the basket as the sugar syrup (when the centrifugal is used in sugar) is nearing its completion of a purge. It is well known in the manufacture of sugar that the injection of a water spray will brighten the color and beautify the appearance of the sugar. This spraying is done immediately following the separating of the syrups and the sugar and before the speed of the basket is reduced in order that the centrifugal intensity will carry the washing water through the crystals at high speed.

A seventh feature of my invention is the centrifugal seal which I employ to prevent leakage, carried by the bottom of the chamber, at its perimeter and when extended by centrifugal action sealing the space between the said bottom and the inner wall of the basket.

An eighth feature of my invention consists of means for changing the air current induced by centrifugal action.

A further feature of my invention is to reduce the speed of the basket while the residuum is being removed therefrom and to have the basket entirely supported by the vertical shaft when purging and at a high speed but by the balls supported in the ball race of the exterior casing and at slow speed while cleaning.

Other features of my invention will be referred to hereinafter.

In the drawings like parts are referred to by marks or figures of a corresponding kind in the different views.

Figure 1 is a general plan of the machine looking down on the top. Fig. 2 is a front view of the machine showing prime shaft and the parts it actuates. Part of the indicator disk is removed to show the clutch moving mechanism in its relation to the other elements. Fig. 3 is also a front view reduced in size and showing the full indicator disk, also showing the basket, one half in vertical section and one half in side section. Fig. 4 is a one half vertical section through the basket and its actuating shaft supporting parts and a one half end elevation of these same parts. Fig. 5 is a plan of the mechanism for raising and lowering the basket cleaner and the main vertical basket supporting shaft of the machine and the manner of supporting the latter shaft. The molasses gate and water jet mechanism are also shown in this view. The main supporting frame is removed but the supporting lugs 50$^a$ 50$^a$ for the basket supporting pin 126 and which lugs are integral with the main supporting frame aforesaid on the underside thereof, are shown in horizontal section through the plane of the center of the pin 126. Fig. 6 is a section on line 1, Fig. 5, showing friction roller and ball bearings and channel therefor. Fig. 6$^A$ is a transverse sectional view of the prime shaft and an end view of the eccentric which primarily controls the movement of the clutch moving arm, also, an end view of this arm. This view also shows the carrier for the double dogs, one of which forces the clutch in and the other out, as will be explained. Fig. 7 is a vertical section through the indicator finger carrying shaft and some of its connections. Fig. 8 is the oscillating lever which is moved by the finger arm and carries integrally the lug or nose for engagement by the dog which throws the prime clutch into operative position. The supporting collar for this lever is also shown in this view. Fig. 9 is the clutch shifting arm with the pivoted interponent 62$^A$ which it carries for disengaging the clutch after the vertical shaft has been raised and the bottom of the basket. Fig. 10 is a side view of the indicator disk, finger and clutch jaw. Fig. 11 shows the indicating finger and its integral arms, the clutch shifting arm and the oscillating lever shown in Fig. 8, all in their correct relative position, just at the time the finger commences to oscillate the said oscillating lever. Fig. 12 is the finger for indicating time for purging. Fig. 13 is a plan of the mechanism for operating the indicator finger and for moving the clutches. Fig. 14 is part end view and part section of Fig. 13. This view also clearly shows the cam for tripping the bell crank lever actuating bar 15 out of normal to be ready for the next operation. Fig. 15 is a section (inside view) of the basket. Fig. 16 is the bottom of the basket. Fig. 17 is one of the centrifugal segments, carried by the said bottom. Fig. 18 shows the cleaner in position after knife has had its full movement and scraper just starting in action. It is a section on line C, Fig. 20. Fig. 19 is a section on line C$^2$ C$^2$ Fig. 22, and shows the action of the sugar as it is thrown from the basket wall and as it is passed from the basket bottom by centrifugal force. Fig. 20 is an elevation of the scraper and its support. Fig. 21 an end view of the cutters. Fig. 22 shows the position of cleaner in relation to bottom. Fig. 23 shows one arm of the cam controlled bell crank lever for swinging the basket cleaner and another position of the bell crank tripping arm indicated by dotted lines. Fig. 24 is the device for changing the time of valve action for feeding the basket with material for purging and also for water jet action. Fig. 25 shows an adjustable lever whereby the throw of the trip for levers 222 and 229 can be varied. Preferred construction. Fig. 26 is a part section on line $a$—$a$ of Fig. 27, part section on line $b$—$b$ of Fig. 27 and plan for unlocking the clutch jaws 28—30', or timer clutch, enlarged with some additional details over what is shown in Fig. 13. Fig. 27 is an end view of the same mechanism shown in Fig. 26. Fig. 28 is a side elevation of the inside and outside interponents removed from their supporting arm 54. Fig. 29 is a plan of the same. Fig. 30 is a section on line X—X of Fig. 28.

*Detail description of machine.*—1 is the main support for the mechanism of the machine, aside from the basket and its immediate supports. This support can be bolted in practice to the tank which applies the molasses or juices it is intended to treat in the machine, or it can be supported on a frame designed for this purpose. It is a matter of prime importance, however, that this frame be held fixed and unyielding in its relation to the basket and its support. The basket should rotate from 1000 to 1700 revolutions per minute, depending on the diameter at high speed and 80 to 100 revolutions per minute at slow. The main support, or bed plate 1 carries bearing supports 4 and 5 and these bearing supports carry bearings 2 and 3, Sheets 1 and 2. In Fig. 1 these bearings are shown as cap bearings, in Fig. 2 as solid ones, but their specific character is immaterial. The bearings 2 and 3 carry a shaft 6° and the said shaft a fast and loose pulley for operating it shown in Figs. 1, 2 and 3, but not numerically designated. 6 is the prime shaft of the machine. 7 is a worm carried on prime shaft 6, and 8 is a worm wheel which it actuates (in the direction of arrow 9). 10 is a shaft on which said worm wheel 8 is rigidly supported and which it rotates. One of the functions of the shaft 10 is to vertically reciprocate the shaft 141 which carries the basket bottom 142, and this is accomplished by the following mechanism.

*Lowering and raising the basket bottom.*—122 is a cam carried on shaft 10, 127 is a friction roller shown in Figs. 1 and 2. This friction roller is carried by a lever 125, Figs. 1, 2, 3, and 5, said lever being U shaped, as shown in Fig. 5 and straddling the shaft 141 by the two arms, forming the U. This lever 125 is pivoted into the main bed plate of the machine and held therein by pivot pin 126. Lugs 50ª and 50ª, shown in horizontal section in Fig. 5 and vertical section and elevation in Fig. 4 support this lever to these integral depending lugs as shown.

128 is a pivot pin holding the friction roller 127 to the lever 125 through arms thereof 131, shown in Fig. 5, 129, 129 are two links, best shown in Figs. 3, 4 and 5, pivoted to either arm of the U shaped lever 125 and supported thereto by pin 130.

133 best shown in Figs. 2, 3, and 4 is a ball bearing carried and supported to lever 125 by links 129, 129 aforesaid.

137 is the direct shaft support; this shaft support rests on the balls 136, in the ball race of 133, through the annular, depending shaft concentric-flange 135.

138 and 139 are two lock nuts permitting of adjustment between the shaft support 137 and the ball carrier 133.

142 is the basket bottom, having a locking nut therefor 143. The shaft 141 is tapered at 144, thus holding the bottom 142 very rigid.

146, 146, 146, 146 are a series of radial arms carried by the basket bottom. These radial arms pass into the holes of the basket perimeter, 156, see Fig. 15. This is the only view in which these slotted holes for the reception of these radial arms are shown, but the position of the arms 146, 146 when assembled is shown in Fig. 4 and Fig. 3.

From the foregoing description it is evident that when the shaft 141 drops down the arms 146 on the bottom of the basket 142 will be free to slide in the slots 156 of the perimeter of the basket. Now while the machine is at high speed the shaft support 137 is in contact with and rests on balls 136, through the annular flange 135 aforenamed and the ring 159, which supports the basket wall 149, with its annular rings 150, 150, and its shields 151, and 152, is raised off of friction balls 161. These latter balls, be it understood, are carried in the stationary annular support therefor, 160, Figs. 3 and 4, the latter being held rigidly to the support 163 and 165 for the outer basket casing. All that is necessary in practice is to have the basket supporting annular ring 159 off the balls 161, when the basket is at high speed or raised from line 170 to line 171, Fig. 4. This relieves the basket from friction as the entire weight is on balls 136, which are few in number and whose ball race is relatively small in diameter. But the moment the cam 122 has moved to permit the shaft 141 to be lowered the basket perimetral ring 159 rests on the balls 161 and this stops the downward movement of the basket perimeter. Now while this perimeter is being raised from line 170 to 171, or say ¼″, the radial arms 146, 146, 146, 146, engage on the upper edge of the slots 156 in the perimeter 149 of the basket, or on the line indicated at *d d*, Fig. 15, but as the shaft 141 moves downward, through the action of the cam 122 and the intervening elements described, and this movement brings the basket ring support 159 in contact with rollers 161, then the said basket perimeter is arrested in its downward motion, and the lugs 146 become disengaged from the top of slot 156 and move down the slot to the limit of the movement of the shaft 141 and the bottom 142. The upper limit of movement of the basket bottom and the action of the material in the basket are shown in Fig. 4, where, it will be seen that basket bottom is up and the solids are held in the basket, while the bottom position of the basket bottom is indicated by dotted lines.

The lower limit of movement of the basket bottom and the action of the material while in this position is shown in Fig. 3, where, it will be seen, the material purged from its liquids is passing out through holes 157, 157, see Fig. 15, by centrifugal action. Line A. B. Fig. 3, indicate lower limit or discharging position of basket bottom, lines A. C. indicate upper limit, or purging position of basket bottom. I do not attempt to illustrate these holes 157, 157 for the discharge of the solids in any but Fig. 15 and would request that this figure be taken in connection with Figs. 3 and 4 and the space between lines *d d* and *e e*, Fig. 15, is the horizontal position the bottom of the basket occupies while the material is being purged, and when the solids are being discharged the downward movement of the bottom, as described exposes the holes 157, 157, permitting them to pass therethrough and from the basket. In Fig. 15, section *e* represents 0 0 perforated metal and section *d* No. 8 wire mesh usual in centrifugal basket construction. 172 is a belt wheel of different diameter 173 representing the smaller, 174 is a belt and M⁶ is belt pulley. Now when the shaft 141 is raised the speed of the basket must be high as this is the purging position, therefore, as it is 0 0 raised the belt 174 is placed on the high part of the pulley 172 and the full rotation is given the shaft 141 that the pulley M⁶ is capable of transmitting when the shaft is lowered so that the belt is on pulley 173, it is so loose that it slips and the basket moves slowly. This is during cleaning the basket of solids after purging.

It is scarcely necessary to say that when the low part of cam 122 is resting on the friction roller 127, the lever 125 is in the position indicated by the dotted line passing through center of pin 130 Fig. 2 and bottom of basket is down, and when the high part of the cam 122 rests on friction roller 127 the basket bottom is up and basket supporting ring 159 is off rollers 161, and lever 125 occupies position of radial line 169. I desire it understood I do not limit myself to the belt actuating power; I could use many modified structures for varying the speed of the motor from maximum during purging to minimum during cleaning, all within the range of my invention. I could use a motor with two speeds, one with full control for one speed and armature control for another speed, and regulating device to change the control from field to armature and vice versa at a predetermined time in the cycle of the machine.

*Cleaning the basket of solids.*—This consists broadly of a frame carrying a series of cutters and deflectors. The entire structure passes down into the basket only after purging, and when down to its limit it is oscillated toward the basket wall in a direction opposite to the rotation of the basket wall or perimeter. The deflector gradually engages with the solids on the wall and removes them and finally a wood broom or sweep, so to speak, sweeps the inner wall of the basket, after which the sweeping mechanism is automatically removed from the basket.

176 is a vertical shaft, 177, 177 are two vertical guide rods for said shaft, parallel therewith, equally distant therefrom and fixed at their two extremities. At their upper extremity they are threaded into or otherwise fixed to bed plate 1 and at their lower extremity riveted or otherwise held by plate 178 or basket cover 160', shown only in Sheet 3 Fig. 3.

179 and 180 are two collars fixed to shaft 176, 181 is a collar guided on rods 177, 177.

182 is a pin holding link 184 to member 181.

It will be understood that the shaft 176 is free to oscillate in collar 181, and it is also free to move vertically in said collar. This shaft 176 extends in practice above the gear 193 a sufficient distance to accommodate the downward movement thereof. That is if the downward movement of the shaft 176 is 14″ the shaft when it is up must extend 14″ above the gear 193, so that by no possibility can the said shaft become disengaged from the said gear. The spline 192 in the shaft must be as long as its vertical movement and the gear 193 must carry the key so as to permit the shaft to move free in its vertical travel. The collars, therefore, 179, and 180 being fixed to the shaft 176 become the thrust receiving members for the vertical movement of the said shaft, and the fact that the collar 181 is guided by the fixed rods 177 prevents it from turning and the link pins 182 are thus held in fixed alinement.

185 is a lever, as shown in Fig. 5; it straddles the rod 176, also the two guide rods 177, 177 and carries two links 184, 184. These links connect the lever 185 with rod lifting collar 181 and whereby the vertical movement of the rod 176 is controlled.

186 is a pivot pin connecting link 187 to lever 185. The lever 185—189 is pivoted to the shaft 10 which carries the cam 122 aforesaid, therefore, as the vertical basket bottom supporting shaft 144 moves down the lever 185 and shaft 176 move down and vice versa, as the former moves up, the latter moves up. This arrangement makes it practically impossible for the basket bottom and the basket cleaner to move out of unison, a very important matter. The dotted line 190 in Fig. 2 shows the upper position of the lever 185 and the dotted line 191 the lower position.

After the rod 176 and its supported parts are down to the limit of their movement the basket wall is cleaned as follows: The shaft 176 at its upper extremity carries a long keyway 192 a key in the key-way and a slotted gear 193, Figs. 1, 2 and 4. This gear is fixed against vertical movement by a holding pin 194 engaging in a circumferential groove 195, Fig. 4 only. Now as the arm 185 of the lever 185—189, is controlled by the lever 125 through link 187, it follows that as the cam 122 raises the lever 125 from the position shown in the solid drawings, Fig. 2, to the dotted line 169, the shaft 176 will slide up the key moving in the said keyway 192 and when these parts move down it will slide down.

In Figs. 1 and 5 I show a cam 123. This cam is not shown on any other views. It is a box cam and carries the roller which operates the bell crank, lever 196. I do not show the roller race of this cam as it is not deemed essential. Sufficient to note that the following is its function: As the rod 176 descends the gear 193 is stationary but immediately the said rod reaches its limit of downward movement the bell crank lever 196 is moved through the link 198, which connects it with rack 199; the said bar carries rod 200, which meshes with gear 193 (201 is a guide for the rack bar). The cam 123 is so timed that when the basket is rotating it holds the chamber cleaners, shown in Figs. 18 to 22 inclusive, in the position shown in Fig. 5, Sheet 5, and indicated by "5th" and it holds the cleaner in this position until the bottom of the basket is lowered to the limit, as shown in Fig. 3, then the said cleaner carried rigidly on the rod 176, is slowly oscillated, first into position marked 1st., Fig. 5, in which position it has its initial contact with the sugar hanging on the wall of the rapidly rotating basket. After position 4<sup>A</sup> is reached the knives 213 on the edge of the cleaner frame will have passed the extreme radius limit of the basket and will have removed all the sugar, save a very thin portion which will still hang in the basket wall. The scraper 204 will then finish the cleaning of the wall by contact therewith. This scraper is made of wood and swings in such a manner on its individual pivot that the wood cleaner 204 when extended radially with the cutters, will increase the net radius and thus insure proper cleaning of the basket wall.

The specific cleaner described could best be used in my method when the specific machine herein set out is in use, but as I do not limit the employment of my method to my machine, as here described, so I do not limit or restrict my method of scraping the wall of the basket or vessel to my specific cleaner or scraper. Any scraper that can be brought in contact with the rotating wall or shell of the basket or vessel at reduced speed of the basket, and remove the solids impacted thereon at this reduced speed, by having the basket laden wall rotating toward the contact point of such cleaner or scraper, would meet the requirements of my invention and come within its scope. I place no limit, therefore, as to the kind, form or character of scraper or cleaner that need be employed, nor the manner of holding it in shell contact during the scraping function, if my specific machine should not be employed in carrying out my method.

*Construction of cleaner.*—206 is a central stem having integral wings 207, 207, 207, 207 and a cutter integral wing connection 208. These parts are all in one solid casting. The shaft 176 passes through the central stem 206 and holds the cleaner firm and rigid therewith. A pin 209, Fig. 22 only. The wings 207, 207, etc., are inclined to an angle of 45° on their support. Now the arrow in Fig. 5 shows the direction in which the basket travels. This corresponds to the arrows 210 of Fig. 19, 211 of Fig. 18 and the arrow 214 Fig. 19 shows the direction of the sugar when brought under centrifugal action in its passing from the basket after being deflected as shown in Fig. 22.

The arrow 212, Fig. 22, indicates the lines of force in which the sugar contacts with the deflectors from which line it is deflected 45 degrees to the bottom 142 of the basket, and is there forced through holes 157, 157, hereinbefore referred to, and as illustrated in Fig. 15.

217, Fig. 18 shows the support for the wood scraper 204, a spring 215 holds these parts in yielding position.

216 is a pivotal support for the yielding scraper holding it to the outer part 208 of the deflector frame.

Now after the walls of the basket are cleaned as described the rod 176 is oscillated back to the position marked after which the cam 122 raises both it and the bottom of the basket by the mechanism described and the machine is ready for another load of syrup.

*Feeding the centrifugal with sugar.*—The manner in which I feed the machine with syrup is as follows: When I employ my method with my specific machine, or when I employ any other type of machine in carrying out my method, I would provide the usual feed pipe, the usual valve or gate and open the gate in the usual manner well known to the art. The manner of feeding material to the basket or vessel is not material and I place no restrictions as to how this can be or should be done; just so the vessel or basket is charged or loaded with a fill-mass, the basket or vessel rotated to a high speed separating the liquid from its associated solids at this speed, whereafter the solids are left impacted on the inner shell wall of the basket or vessel and then I reduce the speed of the basket to the proper slow speed, scrape the wall of the basket shell at the reduced speed, permit the material to pass through the port in the basket in whatever position it may be located and pass the separated solids over the basket bottom, or otherwise, out of the said port.

The cycle or sequence of functions of my method are successive and intermittent. The high speed period must be concluded before the reduced speed can be used, as the separation must be accomplished before the solids are in condition to discharge from the vessel. There may be times or conditions, however, when the high speed may, or indeed should be, interrupted before effective separation is made; as there may be times after the high speed has accomplished a satisfactory separation when the slow speed is or would be interrupted, or times when a full arrest of rotation between the completion of the high speed period and the initial rotation of the slow speed; such varied interruptions, if for any cause made, are of no moment and all come within the scope of my method of separating liquids from solids. I, therefore, desire it distinctly understood that the separating of liquids from solids, according to my method, includes not only separating the liquid and solid components of the fill mass, but the removing of them from their containing vessel as well, and comprehended in the term separating, as I use it, is the removal of both the liquids and the solids from the vessel or basket which holds them while they are being separated from each other As already described 122 is the cam which raises and lowers the bottom of the basket, as soon, therefore, as the basket bottom is raised and the cleaner out of the basket, the cam 122 is on its high point. This point amounts to about 70 degrees of the cam's circumference. When the friction roller 127 which directly controls the movement of the cleaner carrying rod 176 and basket bottom shaft 141, through the levers and links already described, has raised these two rods to their top limit, or initial positions, the pin 228, Fig. 24, on the disk 124, Figs. 1, 5 and 24, occupies the position shown in Fig. 24, as contacting with the bell crank 229. Now while the cam 122 slowly rotates 40° or from radial line I to radial line H, the said lever 229—231 will pull the rod 232 toward shaft 10 and the valve 235 will move from valve position 236 to position marked 235 and the syrup will flow, charging the centrifugal basket through the feed trough shown in Fig. 3. The movement of this valve is indicated in Fig. 3 as being from dotted line $a$ to dotted line $a'$.

The shaft 10, which carries the pin holding disk 124 rotates slowly and when the radial line 237 is reached in the oscillation of the bell crank 229—231, the feed gate 235 has admitted sufficient syrup in the basket for a purge and by a weight or spring (not shown) is immediately closed as the pin 228 passes from lever 229. The friction roller has rolled from H to I in this valve action and syrup feeding just described and the cam 122 has moved from I to H. Now while the cam travels from I to J the slack is taken up in the dog 14 Figs. 1, 13 and 14 and the bell crank 17—108 will have been oscillated, putting the pin 30' in one of the holes of the clutch disk, 28, Fig. 2.

The shaft 10 is the secondary shaft and it will be noted, controls the vertical movements of the basket shaft, the syrup feed valve 235 and the water spray rod 221 and, inasmuch as all these functions are related in the time of their performance with the timing mechanism it also controls this latter mechanism in the following manner: The spur 11 on shaft 10 operates spur 12 on shaft 23, and the cam travels from I to J, as described, and about the time it reaches J, the dog holder 13 on shaft 23 will have taken the position indicated by the dog 14 in dotted line, Fig. 14, and as the bar 15 at this time is down, or at line M², the said dog will engage the said bar and move it forward. 16 is a bell crank lever engaged by a lateral slot in bar 15 at head of said lever 19. 63 is a link pivot-rod pivoted to the longer arm of said bell crank lever, 45 is a pivoted clutch tripping lever, carried pivotally by pin 48 to collar 49 on rod 40. 17 is the short arm of a bell crank and 108 is the long arm thereof. It is pivoted at 18 to sliding link or bar 15.

Now as the dog 14, after contacting with the end of bar or link 15, as described is further moved the bell crank 16 will be oscillated, and the rod 63 thereon will push the pivoted clutch trip 45 from disengagement with the hole 53 of the clutch moving arm. It is evident that this will have been accomplished by the dog 1ᴬ on the dog holder 13, on the shaft 23 moving the said link or bar 15 in the normal direction of its motion, as shown by the arrow 33, (said arrow indicating the direction of rotation for shaft 23) Fig. 14. As the clutch trip 45 passes from the hole 53 as just described, see Figs. 12, 2, 7, 8 and 11, the spring 91, which is fixed to the said lever 45 at one end and to the frame 1 of the machine at the other end, will pull the said clutch lever 45 down against the oscillating arm 59 of its pivoted rod support 58, Figs. 2 and 9 best shown. 62ᴬ is an integral arm or lug on pivoted rod 58. Like 59 it is rigidly held on said rod 58, the said rod being a pivotal support for both 59 and 62ᴬ. 59 being on the outer side of the clutch moving member 54 and in the path of the downward swinging clutch lever 45, and 62ᴬ on the inner side of the same and in the path of the dog 80. Now as the lever 45 is pulled down by said spring it will engage the top of the arm 59 and oscillate it until it reaches the position predetermined by stop pin 94, Fig. 11, and as 62ᴬ is on the same pivoted pin 58, the latter will also be oscillated and this oscillation will carry it from the inner to the outer dotted line 121, Fig. 9, and in this latter position it will be engaged by the vertically reciprocating dog 80 pivoted to 78. During this movement the arm 57, which is the clutch moving arm, and integral with 54 will be oscillated from dotted line 75 to dotted line 74 in Fig. 10, which is the same as line 123 to line 124, Fig. 9 and the clutch jaw 97 will be thus disengaged from clutch jaw 98 and the worm 7 which is carried on the sleeve integral with the clutch jaw 98 will be arrested and therefore the worm wheel 8 and shaft 10 will also be arrested. The friction roller 127 will stop with the cam 122 at line J, in Fig. 24. It is scarcely necessary to remark that the cam 122 in Fig. 24 is in the position it so occupies in this figure when the basket bottom is up and in the position shown in Figs. 2 and 3 when the bottom is down.

It will be seen from the foregoing that as the bar 15 moves forward by the dog 14, as set out, and as the bell crank 16 is oscillated on the pivot 20, the bell crank 108—17 is also oscillated on its pivot 21, and as the arm 108 of the said latter bell crank is oscillated to the radial line 27' the clutch disk 28 is moved toward the pin 30' and one of the several holes in said disk engages said pin, locking thus wheel 29 to disk 28. Thus when clutch jaws 97 and 98 are being disengaged, as just described, jaws 30' and 28 are being engaged. Now while clutches 97 and 98 and 30' and 28 are disengaging and engaging respectively, as described, the shaft 10 rotates 12 degrees, as well as its rigid parts, or from I to J in diagram Fig. 24. Shaft 10 is now at rest because clutch jaws 97 and 98 are disengaged and while this shaft is at rest the shaft 141 is, of course up, and belt 174 is on high part of belt wheel 172, Fig. 3. The purging is, therefore, done while shaft 10 is resting and while the timing finger 41 is traveling rotatively its predetermined limit, at the expiration of which time clutch jaws 97 and 98 are again engaged and the clutches consisting of disks 28 and 30' are disengaged, and the basket bottom and basket cleaner are again ready to go down for which function the cam 122 starts rotating at the radial line J. While this cam travels from J to K or 18° the basket is stationary and while it thus travels the already purged sugars receive a spray of clear water which clarifies and beautifies the sugar.

*The timing mechanism.*—The spraying of the sugar will be hereinafter described, and, our basket is now loaded with purged sugars, I will describe the adjustable timing device to predetermine the time the sugar shall remain in the basket with the bottom up and sealed.

In Figs. 2 and 3, 11 is a spur gear carried on shaft 10, 12, is a spur gear supported on shaft 23, the said shaft 23 being supported on the main bed plate of the machine in any practical way such as bearings shown horizontal section Fig. 13. The spur is rigid with the shaft 23. As already mentioned this shaft 23 carries a dog holder 13, this dog holder a dog 14, the said dog being normally held against a pin 32 by a spring 30, Fig. 14 only, 40 is a shaft carrying an indicator finger 41, and being held thereto by an adjusting screw 67. This permits of the finger being adjustable to any degree of the circular disk with the face numerals, as shown in Figs. 3, 10 and 11. 38 is a spur gear also fixed to shaft 40, 37 an intermediate spur gear and 36 a pinion gear carried on shaft 24. This pinion is held by key fixed to gear so as to rotate with shaft. 29 is a worm wheel of small pitch of teeth, say 180 teeth. The worm wheel 29 carries a spring pin 30', already referred to, said spring pin radially coinciding with a series of holes in the disk 28, see Figs. 2 and 3. This disk 28 and the spring pin 30' form a clutch each of which becomes in effect one of the two jaws, or interlocking members thereof, 26, Fig. 13 is an annular clutch groove. This groove is connected by an intervening sleeve with the hole carrying disk 28. A pin, 27, preferably two pins in arm 108 of the bell crank 108—17 is held in the annular groove 26. 112 is a chain drum fixed on shaft 24 and 110 is a chain on said drum, 109 a weight on said chain, Fig. 2 only. The worm wheel 29 is free on the shaft 24 and the shaft can rotate independently of the worm and likewise the worm wheel independently of the shaft. The clutch jaw 28, however, is held to the said shaft 24 by a key 34, Fig. 13, therefore, the said clutch jaw rotates with the shaft 24. The key 34 permits of a longitudinal movement of the clutch jaw 28 and its integral groove 26, however, it will thus be seen that the shaft 24 is under the influence of the weight 109, on cord 110, when the jaws 30' and 28 are disengaged; and as the spur gears 36, 37 and 38, shaft 40 and finger 41 are all, at all times, operatively connected, the weight will, at any time the clutch jaws 30' and 28 are separated, pull the shaft 24 to its normal position, which position contemplates the said weight resting on its support 111, Fig. 2 only. The parts are so adjusted that when the weight is on its support 111, the finger 41 is at zero, as shown in Figs. 3, 10 and 11.

We will now assume that I am treating a syrup that requires five minutes to purge; I place the finger 41 at the radial line 87, Fig. 11 which position indicates that it will take five minutes for the said finger to travel from radial line 87 to 0 on the diagram after which the basket bottom will be sent down. When I set the finger 41 I first free the screw 67 and turn the finger on its shaft 40. Now this predetermines the point at which the finger will always be automatically returned after a purge and when reseated for a subsequent purge time period predetermination. The reseating of the finger is accomplished by the weight 109, Fig. 2. As this weight is raised by the rotation of the shaft 24, the finger 41 rotates until it has its predetermined movement and when the mechanism is unlocked by the unlocking of the clutch jaws 30' and 28 the weight 109 drops to its normal position of rest on its cushioned support 111, and through gears 37, 38, 39 and shaft 40 finger is again put in line 87, or five minutes from 0 in a normal action of the machine. This finger can be set for any time period purging. Numeral 1 indicates a one minute purge; 2 a two minute purge, and so on. I am not limited to any time predetermination. I could even change the gear combinations to shorten or extend the time on a single indicator dial, as practical requirements may suggest.

It will be remembered that clutch jaws 97 and 98 are always disengaged when jaws 30' and 28 are engaged and vice versa; jaws 97 and 98 are always engaged when 30' and 28 are disengaged, and while the machine is working one or the other of these clutches is engaged. It will also be remembered and understood that whatever jaws 97 and 98 are engaged and shaft 10 is in action purging never takes place, and it will be further remembered that when the jaws 30' and 28 are engaged purging always is taking place as this is the time predetermining clutch for purging and for purging alone.

I have now described how I unlock jaws 97 and 98 after basket bottom is raised and how simultaneously with unlocking these basket moving clutches at the conclusion of loading the basket, I lock the timing mechanism clutch 30' and 28. I have also determined how the time finger 41 is connected with the shaft 24 and how it automatically reseats itself after its predetermined motion of rotation is finished in each cycle of its movement. I have yet to describe how this time finger controls the mechanism to stop itself and start the basket bottom down by changing the clutches. That is unlocking jaws 30' and 28, which operate the time finger 41 and locking jaws 97 and 98 which operate the basket bottom vertically and the other described elements. In describing this mechanism, inasmuch as the same is used for the unlocking of clutch jaws 97 and 98, I will be excused from repeating some elemental relations.

The finger 41 carries an arm 42 (this arm 42, which shown as integral with the finger, I could use it, and indeed prefer to use it separated from the finger, in which case a lug on the finger would engage the arm at a given point of rotation and thus carry the arm with it). They are supported on the shaft 40 being adjustably held thereto by a screw 67, Figs. 7 and 13. This arm and finger are shown in detail in Fig. 12.

45, shown in detail in Fig. 8 also shown in Figs. 7, 11, 1, and 13, is a clutch tripping element for lever. It carries an inward protecting lug 47 and an outward protecting lug 46. It is held by pivots 48 to a collar 49, as previously mentioned, the arms 51 and 52 of the said lever forming the pivotal supports for the pins 48, 48 which hold it to the said collar. The said collar 49 is loose on the shaft 40, the shaft can therefore rotate while the collar and the lever 45 are stationary.

59, Figs. 13, 7 and 2, is a small arm. This arm is fixed to a shaft 58 and the said shaft is journaled into hole 38', Fig. 11, of the bell crank arm 54—57. The arm is on the outer side of the bell crank clutch shifting element 54—57 and when the arm 57 is in the position indicated by the radial line 123, Fig. 9 the arm 59 is in the path of the vertically positioned dotted lines 122. The dog 81, Figs. 6^A, 7, 13, etc., moves in the path indicated by these same dotted lines. 62^A is also an arm fixed to the shaft 58 and on the inner side of the bell crank 57—54, 61 is a stop pin carried by the latter arm and limiting its movement in the direction of the spring. It does this by resting against the radial wall of the hole in the bell crank 57—54. 60 is a spring and 63' a pin holding the spring. The energy in this spring holds the arms 57 and 62^A normally with the pin 61 resting on the wall of the slot aforesaid. These two arms 59 and 62^A are best shown in Fig. 9 and this figure must be taken in connection with Figs. 13, 7, 2, 1, etc., as is evident.

79 is a vertically reciprocating rod in continual action, the eccentric disk 55, Fig. 6^A being fixed to the shaft 6 and the said shaft being in continual rotation while the machine is working. 68 is an eccentric strap carrying a link 71. This link is fixed at 76 to the eccentric strap aforesaid and is held by a pivot 77 to the dog holder 78.

79 is a rod carried in guide M^7, in or on the standard 1, Fig. 6^A, the said guide being a hole in the frame 1.

81 is a dog on the outer side of the dog holder.

86 is a pin in the dog holder arresting the movement of the dog 81 and 83 is a pivotal supporting pin therefor. As the dog holder 78 moves down the dog 81 will have no effect on the lug 47, if in its path, as shown in Fig. 6^A. As it moves up, however, it will pull the lug 47 with it, when it is free to engage therewith.

80 is an inner dog carried by the dog carrier 78. It is also supported on the pin 83, see Fig. 7.

85 is a stop pin carried by the dog holder 78 for the dog 80. It will be noted that dog 80 is free to act in a direction contrary to dog 81, or on the downward movement of the dog holder 78 and its operating connection, 24.

43 is a dog on arm 42, shown in Figs. 6^A and 7, with a stop pin 4 4 for said dog. I show this as a modification, but I prefer in practice an integral lug on the arm 42, as shown in Figs. 11 and 12. In Fig. 6^A, 69 is one of the arms of the clutch shifter 54—57 and straddles the clutch 55. The plane of arms 57 and 69 is the same, therefore, I do not show it in other views. In Fig. 10 the pin 72 engages in annular groove 73 to control the movement of the clutch jaw 97. I do not designate this pin in other views, as it is so well known.

62 is a spring, Figs. 7, 2, 13, etc., fixed to the lug 64 of the shaft bearing 40, at one end and at the other to the lever 45. The end of this spring passes in the arc shaped slot 56 of the clutch shifter lever 54—57, as shown in Figs. 7 and 9.

Having now described the details of this clutch changing mechanism its operation is as follows: Figs. 8, 9, 11 and 12 must be taken in connection with Figs. 2, 7, and 13 to correctly understand this operation. Radial lines 75 in Fig. 10 and 123 in Fig. 9 show the position of arm 57 when the clutch jaw 97 is closed, or when the basket bottom is moving, or syrups being put in basket, as already set out. Lines 74 and 124 represent an open condition of the clutch jaw 97, or when the timing mechanism is in action. Shaft 40 carries collar 49, as already set out free, and lever 45 is carried by the said collar it will be remembered, 54—57 lever is also carried by shaft 40 free, that is the shaft can rotate without rotating clutch lever 54—57, Fig. 7. 53 is a hole in arm 54 designed to admit lug 47 of lever 45 when the hole and lug coincide positionally. As already set out the finger 41 and arm 42 are fixed by adjusting set screw 67, to shaft 40. Now the dog carrying rod 79 and the dog carrier 78 are in continual vertical reciprocation and the dogs 80 and 81 are therefore, continually moving up and down on the inner face of the part 54 of the clutch shifter 54—57. Now we will, as previously, assume that the timing mechanism is set for five minutes. The finger 41 is then at line 87 in Fig. 11, and the arm 42 with its lug 43 would be between 7 and 0. (These parts in action rotate in the direction of the arrow, Fig. 11.) 94 is a stop pin for the lever 45, Fig. 11, and 91 a spring holding 45 against this pin. When in this position, as shown, in Fig. 7 in dotted lines, the lug 47 presses against the outer face of the part 54 of the clutch and is disengaged from the aforenamed hole 53. Immediately on the clutch jaw 97 being disengaged from jaw 98, as described hereinbefore, and the jaws 30′ and 28 becoming engaged, as also set out previously, the shaft 40 will slowly rotate and finger 41 will also rotate until arm 42 reaches position of radial line 92, at which point the dog or lug 43 of arm 42 engages lug 46 of lever 45, best shown in Fig. 7, and oscillates it from radial line 92 to radial line 93, and when arm 42 reaches position 93, finger 41 is at 0 and the five minutes has expired. Immediately spring 62 will snap lug 47 of lever 45 in hole 53 of part 54 of clutch moving arms 54—57, or from the dotted line Fig. 7 to solid drawing same figure, whereupon the dog 81 moving in path 122, Fig. 9, will engage on the under side of said lug 47 and swing the arms 54—57 so the radial slot 53 which now carries the lug 47 will be thrown from the radial line 95 to radial line 96, Fig. 9, and jaw 97 will be thus engaged with jaw 98, and the basket bottom on the shaft 141 will move down as fully hereinbefore set out, by cam 122 on shaft 10.

I have already described how I move bar 15, bell cranks 16 and 108—17 and how I throw arm 62$^A$ in the path of the downward acting dog 80; for, it will be remembered, as soon as lever 45 is moved by rod 63 so the lug 47 passes out of hole 53 of the clutch arm 54, Fig. 13, the spring 91 will snap the arm 45 against the arm 59 and through the common supporting rod 58 snap the arm 62$^A$ in the path 121 of the moving and downward acting dog 80 and as this dog moves down to its limit when so striking the arm 62$^A$ it oscillates the arm 57 from line 123 to line 124 and opens clutch jaws 97—98 and the basket shaft 141, molasses gates and spraying mechanism are all arrested, shaft 10 being stopped.

I have yet to describe how I disengage clutch jaws 30′ and 28 as 97 and 98 are engaged. This I accomplish as follows:—In Fig. 14, 101 is a depending lever or bar pivoted to a support on the frame 1 at 103, support not shown. 100 is a link having a slotted end at 102 and pivoted to said lever 101; 99 is a projection on the sleeve end 66 of belt shifter 54—57, which engages the link 100. 106 is an adjusting lug to be used or otherwise. Now, Fig. 14, as the jaw 97 is put in contact with 98 by arm 57 the depending projection 94 is oscillated radially to the angular position of the dotted line projected radially from the center of the shaft 40 in Fig. 14. Now as arm 107, Fig. 13, of the double bell crank 17—108—107 is engaged by this movement as shown the arm 108 will be oscillated from line 27′ to normal or as shown in the solid drawing Fig. 13 and the jaws 30′ and 28 will be disengaged simultaneously with the engaging of the jaws 97 and 98 through the oscillation of the arm 57 from line 124 to line 123 Fig. 9, I have already described how I rotate shaft 23 and through dog holder, Fig. 14, 13 the supported dog 14 will engage the end of the link 15 and through bell crank 16 move rod 63 and trip lever 45, thus putting into operation the mechanism which unlocks the basket bottom moving clutch jaws 97 and 98; and how simultaneously jaws 30′ and 28 are united. It will be noted that I show a slot in link 15. This slot is to insure the rod 63 moving the lever 45 slightly in advance of jaw 28 as the movement of the rod 63 must be greater than clutch jaw 28. Now after the clutches aforenamed are thrown into and out of action respectively by the said link 15 and the shaft 23 is stopped the dog 14 rests rearward of, but still engaged with the said link 15. This is substantially in a horizontal position and is indicated by horizontal line M². The normal position of the dog 14 before it contacts with the end of the link 15 is as shown in solid drawing Fig. 14, or resting against the pin 32. No movement will be given to the bar 15 until the dog 14 is oscillated against pin 31, as the spring 30 is not strong enough to move the said bar 15, but the moment the dog 14 strikes pin 31 in dog holder 13, shown in Fig. 14, when the link 15 will be moved operating the bell cranks 16 and 108—17 as fully described. The shaft 23 and dog holder 14 are now at rest with the dog 14 in the position of the dotted line and resting against the end of link 15.

Now it would be impossible for me to start the machine again until I unlocked link 15′ or raised it out of the path of the rotating dog 14. This I do as follows: 25 is a pivoted lever having two pins 29′ 29′ which engage link 15. This lever is shown in Fig. 13 as pivoted into an integral lug on the main bed plate 1. 22 is a cam carried by the shaft 24 and made a part of the chain drum 112. After the clutch jaws 30′ and 28 are united, as set out, the shaft 24 and chain drum 112 with cam 22 rotates and as the cam 22 contacts with the lever 25, which it does on rotating the said lever is oscillated and the link 15 is raised at its dog contact end and takes the position indicated by dotted line M³, or that shown in Fig. 14. This raise is sufficient to permit the dog 14 to be snapped under the link 15 by the energy in the spring 30 and there it rests until the clutch jaws 97 and 98 are again united and move worm 7 rotatively for the dropping of the basket bottom through worm wheel 8, shaft 10 and cam 122. While I show a rounded end 19 on bell crank 16 I do not limit myself to this structure, however, the increased section of the link 15 where the end 19 of the bell crank 16 engages the link 15 permits the link to be raised without disengaging their operative position. The pin 18 and rounded head 19 are loosely fitted to permit of the lever being oscillated from line M² to M³ without strain, and with 18 as the pivot point.

*Spraying the sugar.*—Returning now to the spraying of the sugar, Fig. 24, 218 is a spraying nozzle, 219 a pipe leading thereto and 220 a plunger chamber, plunger not shown, 221 is the rod carrying the plunger, 222 is the lever carrying said rod being pivoted together at 223. 224 is a pivot support for lever 222. 225 is the arc described by the end of the lever 222. The radial line 226 shows the movement of the lever 222.

In Fig. 24 while the cam roller travels from J to K, immediately preceding the downward motion of the basket bottom and cleaner, the pin 228 will move the lever 222 from the position shown in the solid drawing Fig. 24, to that indicated by the dotted line 226. Meanwhile, the plunger rod which carries a piston in chamber 220 will spray the sugar as shown in this view and the pin 228 will have cleared the end of the rod 222 simultaneously with the friction roller 127 letting down basket and cleaner as fully set out. The lowering of the basket, the holding of same down and the raising thereof in the machine consumes 270 degrees of the cam revolution. The feeding of the molasses or syrup 40 degrees. The unlocking of the clutches 12 degrees and the spraying of the sugars to clarify, 18 degrees. These functions can be contracted in degrees or can be extended to suit any requirements or conditions. It can be done by changing the high side of the cam or by changing the pin 228 in its position from the center of the cam carrying shaft.

In Fig. 25 I show the manner in which I could construct a movable pin for controlling the molasses and water jet feed. It consists of a lever 230, pivoted to the disk 124 at 231 having an arc shaped slot 233, with a lock nut 234 on a slot 235. The radial lines 236 and 237 show variable positions for this lever or arm. The slot 233 can be made of any length to suit practical needs or requirements. This is shown in Fig. 1 and it is mounted rigidly on shaft 10. By this variable means I can accurately determine the amount of molasses I need for a purge and it will give the same volume until I change the adjustment. In the manufacture of sugar this variable feed of material in connection with my device for predetermining a time period for which material shall remain in the basket and my ability to vary this predetermination to meet any practical requirement, enables me to automatically handle sugar laden syrups in a thoroughly practical manner and effects great economies in the art. While I speak of sugars, it will be understood I do so merely to elect a representative fill mass for I can equally separate other materials. I desire it fully understood that I do not limit myself to specific structure in any particular. I do not even limit myself to the employment of my machine for the purpose of carrying out my method, as any machine that is provided with a means to rotate the basket at a high separating speed and can be provided with a means to give this basket a reduced speed and maintain the reduced speed for the period necessary for the cleaner to scrape the basket or shell wall and permit the passing of the separated solids out of a port in the basket, would be suitable for the use of my method. I could make many modifications of structure without departing from my process or invention. Instead of mounting the basket cleaner on a vertical shaft, I could oscillate it on an external pivot swinging it into the basket and out, as desired. I could also make many forms of timing mechanism, but these modifications would but accomplish the same purpose and of the many possible ways I think my specific structure the best. My claims I lay broadly for fundamental protection.

I claim—

1. The process of separating liquids from solids which consists of putting an unseparated mass in a rotating vessel, rotating the vessel at high separating speed at which speed the liquid is passed from the solids and the vessel, reducing the speed of the vessel to a predetermined slow speed, maintaining the vessel at the slow speed for a predetermined time, removing the solids from the wall of the vessel at the slow speed, exposing a port in the vessel after the high speed, conducting the solids as removed from the wall of the vessel to the bottom and thereover to said exposed port by the force inherent in the rotating mass.

2. The method of separating liquids from solids which consists in putting an unseparated mass in a vessel, rotating the vessel at a high predetermined speed for a predetermined time, during which time the liquids are separated from the solids, reducing the speed of the vessel to a predetermined slow speed, scraping the wall of the vessel while rotating at the slow speed, exposing a discharge port in the said vessel when the speed is reduced and passing the solids through the said port from the said shell by the force inherent in the mass.

3. The process of separating liquids from solids which consists of putting an unseparated mass in a rotating vessel, rotating the vessel at a high separating speed, maintaining the high speed for a predetermined time, conducting the separated liquid from the vessel at high speed, reducing the speed of the vessel to a predetermined slow speed, scraping the separated material from the shell of the vessel at said predetermined slow speed, maintaining said slow speed for a predetermined time, opening a port in the vessel after high speed and conducting the separated solids, as scraped from the said wall over the bottom of the vessel, to said port by the force inherent in the rotating mass.

4. The process of separating liquids from solids comprising putting an unseparated material in a vessel, rotating the vessel and the material at a high predetermined speed during which speed the liquid is separated from the solids by virtue of the speed of the mass of the vessel, reducing the speed, maintaining a reduced speed for a predetermined time, removing the separated solids from said wall by a scraper, while the vessel is rotating at the slow speed, opening a port in the vessel; passing the solids, as removed, from the shell of the vessel to and through the said port at the said slow speed.

5. The process of separating liquids from solids comprising putting an unseparated material in a rotating vessel, passing the liquid out of the vessel at a high speed by centrifugal force, reducing the speed of the vessel, rendering available a port in the vessel for the passing of solids, changing the position of the solids in the vessel while rotating at the reduced speed from the shell wall of the vessel to the bottom and passing said solids out of the vessel at the reduced speed through the available port after their position is changed by force acquired by rotation.

6. The process of separating liquids from solids comprising putting an unseparated mass in a vessel, giving the vessel a high predetermined speed of rotation, passing the liquids out of the vessel and out of the solids at the high speed by virtue of the force of rotation, giving the vessel a slow speed, exposing a port in the vessel at the slow speed, scraping the shell of the vessel at the slow speed to remove the separated solids therefrom, and permitting them to pass out the exposed port at slow speed.

7. The process of separating liquids from solids comprising putting an unseparated mass in a vessel, rotating the material at a predetermined high speed, holding the solids in the vessel while the liquids are passing therefrom under the force acquired by rotation, reducing the speed of the vessel, exposing a port in the vessel, removing the separated solids from the shell of the vessel at slow speed and conducting and passing the said solids to and through the exposed port at the slow speed by virtue of the force inherent in the rotating mass of separated solids.

8. The method of separating liquids and solids comprising putting an unseparated material in a vessel rotating at a high predetermined speed, reducing the speed of the vessel to a predetermined slow speed, maintaining this slow speed for a predetermined time, removing the separated solids from the wall of the vessel during this time of slow speed rotation and passing them to the bottom of the vessel at this time and exposing a discharge port in the vessel and thereafter removing the solids through said discharge port by the force inherent in the rotating mass of material.

9. A process for separating and cleaning solids from liquids comprising putting a solid and liquid compound into a vessel, rotating the material and vessel at a high speed, putting a spray of washing water on the solids after the liquid is separated from the solids at high speed, reducing the speed of the vessel, scraping the solids from the shell of the vessel at the reduced speed, opening a port in the vessel after high speed and passing the washed and separated solids out of the vessel through the port by virtue of the force inherent in the rotating mass of solids.

10. The method of separating liquids from solids comprising the putting of an unseparated mass in a vessel, rotating the vessel at a high speed, holding the solids of the mass in the vessel while at high speed and permitting the liquids to pass out of the solids and out of the vessel under the influence of centrifugal force, passing a water spray through the solids while the vessel is rotating at high speed, reducing the speed of the vessel, maintaining a uniform slow speed for a uniform time, exposing a port in the vessel after the liquid and the solids are separated, freeing the solids from the shell of the vessel while the vessel is rotating at a slow speed and passing them over the bottom through the exposed port by virtue of the force inherent in the rotating mass.

11. The process of cleaning and separating sugar from its associated syrup comprising putting the fill-mass in a vessel, rotating the vessel at a high separating speed, permitting the syrup to pass from the vessel at this speed under the influence of centrifugal force, jetting a water spray on the sugar at the high speed after it is relieved of syrup, reducing the speed of the vessel to a predetermined slow speed, maintaining the slow speed for a predetermined time, scraping the separated and washed sugar from the shell of the vessel at slow speed and placing it on the basket bottom, opening a port in the vessel and passing the sugar over the basket bottom to and through said port and out of the basket by the force inherent in the rotating mass of sugar.

12. The method of separating liquid from solids which consists in holding a saturated material in a vessel, rotating the vessel at the high separating speed and passing the liquids out of the solids and out of the vessel at high speed, reducing the speed of the material to a predetermined slow speed, freeing the solids from the vessel at the slow speed, opening a port in the vessel, and passing the solids out of the vessel through said port at slow speed by the force acquired by rotation.

13. The method of separating liquids from solids which consists of putting an unseparated material in a vessel, rotating the vessel at a high speed, reducing the speed of the mass in the vessel to a predetermined slow speed, removing the separated solids from the wall of the rotating vessel at the said slow speed, exposing a port in the vessel and passing and removing the separated solids from the vessel through the opened port at the slow speed by the force acquired by the speed.

14. A method of separating liquids from solids which comprises putting an unseparated material in a vessel, rotating the vessel at a high predetermined speed, maintaining the high speed long enough to pass the liquid from the solids by centrifugal force, reducing the speed of the vessel to a predetermined slow speed, scraping the wall during the slow speed, exposing a port in the vessel and passing the solids as removed from the wall to the bottom of the vessel and over the bottom of the vessel to the port exposed in the vessel, wherethrough they are discharged from the vessel.

15. The method of separating liquids from solids which comprises putting an unseparated material in a vessel, rotating the vessel at high speed, permitting the passing of the liquid out of the solids and out of the vessel at the high speed, reducing the speed of the vessel to a predetermined slow speed, scraping the wall of the vessel with a static scraper, exposing a port in the vessel and passing the solids from the vessel when so removed through the said port at the slow speed.

16. The method of separating liquids from solids which comprises putting an unseparated material in a vessel, rotating the vessel at high separating speed, maintaining the high speed for a predetermined time, reducing the speed to a predetermined slow speed, maintaining the slow speed for a predetermined time, putting a static scraper in contact with the rotating mass of separated solids hanging on the shell of the vessel while the latter is rotating at slow speed, removing the separated solids from this wall by this scraper, exposing a port in the vessel, and passing the separated solids through an exposed port in the vessel while at slow speed.

17. The method of separating sugar from its associated syrup and washing it comprising putting the fill-mass in a vessel, rotating the vessel at high speed for a predetermined time at which speed the syrup is passed from the crystalline sugar, putting a spray on the sugar at high speed after the passing of the syrup, reducing the speed of the vessel, maintaining a slow speed for a predetermined time, putting a static scraper in contact with the sugar crystal mass while the vessel is rotating at slow speed to remove it from the shell of the vessel, exposing a port in the vessel and permitting the sugar to pass through the port while the vessel is rotating at slow speed by virtue of the momentum of the mass.

18. The method of separating liquid from solids comprising putting an unseparated mass in a rotating vessel giving to the mass separating effectiveness by high centrifugal intensity for a predetermined time, reducing the speed of the vessel, thus giving to the mass low centrifugal activity, removing the separated solids from the shell of the vessel at low centrifugal intensity, exposing a port in the vessel and passing the separated solids through said port to discharge at low centrifugal intensity as removed from the shell wall by the combined forces of centrifugal momentum and gravity: both acting on the mass.

19. A continuously intermittent method of separating liquids from solids comprising putting intermittently an unseparated mass in a vessel, intermittently and successively rotating the vessel at a predetermined high speed for a predetermined time, intermittently and successively reducing the speed of the vessel to a predetermined slow speed, maintaining the vessel at the predetermined slow speed for a predetermined time, intermittently and successively scraping the wall of the vessel at the slow speed, removing the separated solids thereon impacted, intermittently and successively exposing a port in the vessel and intermittently and successively passing the separated solids out of the said port to exit in intermittent successive order and in successive consecutive sequence.

20. The method of separating liquids from solids which consists of putting a fill-mass in a vessel, rotating the vessel at a high separating speed long enough to separate the liquids from the solids, reducing the speed of the basket after the liquids and solids are separated, putting a scraper in contact with the material hanging on the basket shell at the reduced speed, thus removing the separated solids hanging thereon, rendering a port in the vessel available for the passage of solids and passing the solids through the said port at the reduced speed.

In testimony whereof I affix my signature in presence of two witnesses.

HOMER A. HERR.

Witnesses:
FRANCIS P. MALONE,
M. D. HERR.